(12) United States Patent
Assmann et al.

(10) Patent No.: US 8,802,748 B2
(45) Date of Patent: Aug. 12, 2014

(54) GRAFT POLYMER MIXTURE

(75) Inventors: Andrea Assmann, Unterreit (DE);
Roland Reichenbach-Klinke, Traunstein (DE)

(73) Assignee: BASF Construction Solutions GmbH (DE)

(*) Notice: Subject to any disclaimer, the term of this patent is extended or adjusted under 35 U.S.C. 154(b) by 593 days.

(21) Appl. No.: 12/600,931

(22) PCT Filed: Apr. 25, 2008

(86) PCT No.: PCT/EP2008/055089
§ 371 (c)(1),
(2), (4) Date: Jan. 27, 2010

(87) PCT Pub. No.: WO2009/019050
PCT Pub. Date: Feb. 12, 2009

(65) Prior Publication Data
US 2010/0160488 A1   Jun. 24, 2010

(30) Foreign Application Priority Data
Aug. 8, 2007 (DE) .......... 10 2007 037 466

(51) Int. Cl.
C09K 8/42 (2006.01)
C08F 271/00 (2006.01)
C08L 77/00 (2006.01)
C08F 290/14 (2006.01)
C09K 8/524 (2006.01)
C08L 89/06 (2006.01)
C08L 51/08 (2006.01)

(52) U.S. Cl.
CPC ............ C08F 290/145 (2013.01); C09K 8/524 (2013.01); C08L 89/06 (2013.01); C08L 51/08 (2013.01)
USPC .......... 523/130; 525/426; 525/54.5

(58) Field of Classification Search
CPC ..... C08F 290/145; C09K 8/524; C08L 89/06; C08L 51/08
USPC .................. 523/130; 525/426, 54.5
See application file for complete search history.

(56) References Cited

U.S. PATENT DOCUMENTS

| | | |
|---|---|---|
| 3,936,408 A | 2/1976 | Adams et al. |
| 4,015,991 A | 4/1977 | Persinski et al. |
| 4,053,323 A | 10/1977 | Adams et al. |
| 4,278,749 A | 7/1981 | Wright |
| 4,579,927 A | 4/1986 | Patel et al. |
| 4,587,283 A | 5/1986 | Hille et al. |
| 4,654,085 A | 3/1987 | Schinski |
| 4,703,801 A | 11/1987 | Fry et al. |
| 4,938,803 A | 7/1990 | Huddleston et al. |
| 5,134,118 A | 7/1992 | Patel et al. |
| 5,147,964 A | 9/1992 | Huddleston et al. |
| 5,207,941 A * | 5/1993 | Kroner et al. ............. 510/337 |
| 5,339,903 A | 8/1994 | Eoff et al. |
| 5,372,642 A | 12/1994 | Bartz et al. |
| 6,013,774 A | 1/2000 | Meister et al. |
| 6,019,835 A | 2/2000 | Chatterji et al. |
| 7,150,319 B2 | 12/2006 | Heier et al. |
| 7,202,319 B2 | 4/2007 | Spindler et al. |
| 2002/0005287 A1 | 1/2002 | Reddy et al. |
| 2003/0176757 A1* | 9/2003 | Akae et al. ............. 588/252 |
| 2010/0240802 A1 | 9/2010 | Matzinger et al. |

FOREIGN PATENT DOCUMENTS

| | | |
|---|---|---|
| CA | 2054518 | 5/1992 |
| DE | 195 43 304 | 5/1997 |
| DE | 10 229 837 | 4/2003 |
| DE | 10 314 354 | 6/2004 |
| DE | 10 2006 038809 | 2/2008 |
| EP | 0 015 880 | 9/1980 |
| EP | 0 052 156 A | 5/1982 |
| EP | 0 052 156 A1 | 5/1982 |
| EP | 0 095 730 | 12/1983 |
| EP | 0 116 671 | 8/1984 |
| EP | 0 427 107 | 5/1991 |
| EP | 0 483 638 | 5/1992 |
| EP | 0 653 547 | 5/1995 |
| EP | 1 090 889 | 4/2001 |
| EP | 1 418 189 A | 5/2004 |
| EP | 1 418 189 A2 | 5/2004 |
| GB | 2 210 888 A | 6/1989 |
| WO | WO 03/033860 | 4/2003 |
| WO | WO 03/085013 | 10/2003 |
| WO | WO 2008/019987 A | 2/2008 |
| WO | WO 2008/019987 A1 | 2/2008 |

* cited by examiner

*Primary Examiner* — Mark Kaucher
(74) *Attorney, Agent, or Firm* — Fulbright & Jaworski LLP

(57) ABSTRACT

A graft polymer mixture comprising a grafting base based on brown coal and/or polyphenol is proposed, which has, as a graft component, a copolymer consisting of one or more ethylenically unsaturated monomers different from one another and one or more polyamides different from one another. Typical grafting bases are brown coal, brown coal coke, lignite and brown coal derivatives and tannins. Suitable graft components are in particular vinyl-containing components and styrenes, which may also be present in sulphonated form. Natural polyamides, such as, for example, casein, gelatin and collagen, are suitable polyamide components. These graft polymers having a preferred molar mass $\overline{M}_n > 5000$ g/mol are suitable as a mixture, in particular in construction chemistry applications, and in the development, exploitation and completion of underground mineral oil and natural gas deposits, and in deep wells, since they have excellent salt and temperature stabilities and are simultaneously water-soluble and/or biodegradable.

32 Claims, 1 Drawing Sheet

GRAFT POLYMER MIXTURE

This application is a §371 of PCT/EP2008/055089 filed Apr. 25, 2008, which claims priority from DE 10 2007 037 466.8 filed Aug. 8, 2007.

TECHNICAL FIELD

The present invention relates to a graft polymer mixture based on grafting bases different from one another.

BACKGROUND OF THE INVENTION

Water-soluble polymers which are prepared by polymerization of ethylenically unsaturated monomers have a wide range of uses as additives in construction chemistry applications and in the development, exploitation and completion of underground mineral oil and natural gas deposits. U.S. Pat. No. 4,053,323 and U.S. Pat. No. 3,936,408 disclose the use of polyamidosulphonates as flow improvers for hydraulic binders, in particular in the cementing of wells. WO 03/085013 A1 discusses water-soluble copolymers based on olefinic sulphonic acids and the use thereof as fluid loss additives for aqueous building material systems which contain mineral binders. DE 102 29 837 A1 describes polymeric fluid loss additives for drilling fluids and cement slurries based on vinyl-containing sulphonic acids. According to U.S. Pat. No. 4,654,085, polyacrylamide is used together with cellulose ethers and starch ethers as an additive for improving the sag resistance of cement formulations. Furthermore, water-soluble copolymers based on acrylamidoalkylenesulphonic acid, N-vinylamides, acrylamide and vinylphosphonic acid are used for reducing the inflow of water in the extraction of oil or gas (cf. WO 03/033860 A2). EP 0427107 A2 discloses the use of a water-soluble copolymer consisting of ethylenically unsaturated sulphonic acids and acrylamides as a theological additive for drilling fluids. A further field of use for water-soluble polymers which are prepared with the aid of a polymerization of ethylenically unsaturated monomers is the removal of oil from mineral oil-containing sand or rock masses, as discussed in EP 095730 A2. The use of copolymers based on hydrolysed acrylamide and sulphonic acid derivatives as fluid loss additives in cement slurries is described in U.S. Pat. No. 4,015,991.

Fluid loss additives serve for reducing or completely preventing the escape of water from slurries of inorganic or organic binders or pigments. Causes for the water loss are generally capillary forces, which emanate from porous substrata. Fluid loss additives can either bind water to themselves owing to their chemical structure or promote the formation of a dense filter cake on the substratum. Fluid loss additives are used for this purpose, as described above, for example in renders, tile adhesives, grouts, filling and self-leveling materials but also in deep well cement slurries. Moreover, they are used, inter alia, also in aqueous clay suspensions which may serve, for example, as drilling fluids. A number of compounds having such capabilities are known from the prior art. Thus, EP-A 1 090 889 describes mixtures of clay and guar as fluid loss additives. DE-A 195 43 304 and U.S. Pat. No. 5,372,642 disclose cellulose derivatives as fluid loss additives, and EP-A 116 671, EP-A 483 638 and EP-A 653 547 describe synthetic polymers which contain acrylamido-substituted sulphonic acids as comonomers.

All these water-soluble polymers which are known from the prior art and are prepared by polymerization of ethylenically unsaturated monomers are as a rule not biodegradable. Thus, these compounds may accumulate in the environment and contribute to the contamination of soils or bodies of water. This is of particular relevance if cement slurries come into contact, for example, with drinking water or areas used for agriculture. In this context, the use of water-soluble polymers in the exploration and production of mineral oil or natural gas at sea, i.e. in the so-called offshore area, must also be taken into account in particular. Here, these polymers are used, for example, as fluid loss additives for cementitious systems in the construction of drilling platforms and in the cementing of wells. The polymers used may in the first case be washed out by sea water and in the latter case pass over from the cement slurries into water-carrying formation strata. It is for this reason that, according to the "Convention for the protection of the marine environment in the north-east Atlantic" (OSPAR Convention), biodegradable products are to be given preference for use in a marine environment.

In isolated cases, the prior art mentions biodegradable, polymeric additives for cement slurries. Thus, U.S. Pat. No. 6,019,835 discloses modified lignosulphonates as biodegradable flow improvers. The prior published US application 2002/0005287 describes polyaspartic acid as a biodegradable high-performance flow improver. Water-soluble, biodegradable polyamide-based copolymers and the use thereof are disclosed in DE 103 14 354 A1. The copolymers described there have at least one grafted-on side chain, composed of aldehydes and sulphur-containing acids and optionally of at least one compound from the series consisting of ketones, aromatic alcohols, urea derivatives and amino-s-triazines. Natural polyamides, such as caseins, gelatins and collagens, are mentioned as preferred polyamide components. The copolymers described here are used in particular as flow improvers or fluid loss additives for inorganic binders and pigments. The water retention power described is due predominantly to synergistic modes of action of the described copolymers together with modified polysaccharides. it is true that these water-soluble polymers are biodegradable; however, they have as a rule the major disadvantage that they do not permit as large a variability of the chemical composition as the polymers composed of ethylenically unsaturated monomers and are therefore also greatly limited in their range of applications, i.e. for example with respect to temperature or pressure changes or with respect to variations of the aqueous medium in terms of the salt concentration. Since a multiplicity of different ethylenically unsaturated monomers are available, which in each case have different functional groups, a suitable polymer can be "tailored" for many requirements generally by a variation of the monomers.

Gelatin graft polymers are generally disclosed in the European Patent application EP 0 015 880. According to this publication, the polymers are used in receiving elements and serve in particular as dye mordants for photographic materials. The graft polymers described consist at least of three components, which are water-soluble protein-like polymers, a monomer giving a water-insoluble polymer on homopolymerization and finally a monomer containing a sulphonate group and giving a water-soluble polymer on homopolymerization. Gelatin is designated as a typical member of the water-soluble, protein-like polymers and acrylic monomers as typical members of the monomers which give a water-insoluble polymer.

The non-prior-published German document DE 10 2006 038 809.7 discloses a water-soluble and biodegradable polyamide-based copolymer and the use thereof. The copolymer described here contains at least one grafted-on side chain which is composed of ethylenically unsaturated compounds. An additive for compositions containing hydraulic binders and in particular a fluid loss additive are mentioned as a preferred use. The polyamide component is preferably selected from the series of the natural polyamides, degradation products thereof formed by oxidation, hydrolysis or depolymerization, and synthetic polyamides and corresponding degradation products, also being suitable. Typical members of the ethylenically unsaturated component are vinyl-containing compounds. These biodegradable and water-soluble copolymers are also suitable for extreme conditions, as occur in particular in the development, exploitation and completion of underground mineral oil and natural gas deposits and in the case of deep wells. Depending on the composition of the grafted-on side chains, the copolymers described can also be used as flow improvers, it being shown that the flow properties of the slurries to which they have been added significantly improve.

As already discussed, extreme conditions which manifest themselves in particularly high temperatures and salt contents prevail in particular in relation to cementing of wells. Graft polymers of olefinic monomers on brown coal or tannin derivatives as a grafting base are known in this context from the prior art:

U.S. Pat. No. 4,579,927 describes copolymers which are composed of flavanoid tannins and acrylic monomers. Such polymers are water-soluble and show a pronounced thermal stability. Moreover, these copolymers can be used as additives in aqueous drilling fluids. A typical copolymer consists of tannin and ethylenically unsaturated monomers, such as, for example, vinylsulphonic acid. Moreover, substituted amides may also be present. A method for reducing the so-called fluid loss in cementitious compositions which may have high salt concentrations is disclosed in U.S. Pat. No. 4,703,801. The additive described is a graft polymer, whose grafting base may be lignin, lignite or derivatized cellulose. Homopolymers, copolymers and terpolymers of 2-acrylamido-2-methylpropanesulphonic acid (AMPS), acrylonitrile, N,N-dimethylacrylamide, acrylic acid and N,N-dialkylaminoethyl methacrylate and their salts are suitable as grafted-on groups. Finally, U.S. Pat. No. 4,938,803 describes grafted vinyl lignites which can be used as fluid loss additives. The lignite is grafted with at least one vinyl monomer, it being possible for this monomer also to be present in a mixture with at least one comonomer, such as, for example, AMPS. Finally, reference may be made to the U.S. Pat. No. 5,147,964, according to which vinylically grafted tannins are used for reducing the fluid loss in cement slurries which are employed in the oil field area. In this case, too, AMPS, in addition to acrylamide, is a typical member of the vinyl monomer.

The main disadvantage of all these polymers described in the last-mentioned US documents is their lack of biodegradability, and it is for this reason that they cannot be used in the offshore area, taking into account the application specifications described.

Object of the Invention

It was therefore the object of the present invention to provide novel graft polymers and mixtures thereof which are water-soluble and biodegradable, it having been intended to rely on grafting bases which are advantageously obtainable from economic points of view and which require no complicated steps with regard to the synthesis.

BRIEF SUMMARY OF THE INVENTION

This object was achieved with the aid of a graft polymer mixture based on grafting bases different from one another, which, essentially for the invention, is characterized in that the graft polymers contain as monomer component a) brown coal and/or polyphenol derivatives and/or b) polyamides and c) ethylenically unsaturated monomers different from one another.

DETAILED DESCRIPTION OF THE INVENTION

Figures 1A, 1B:
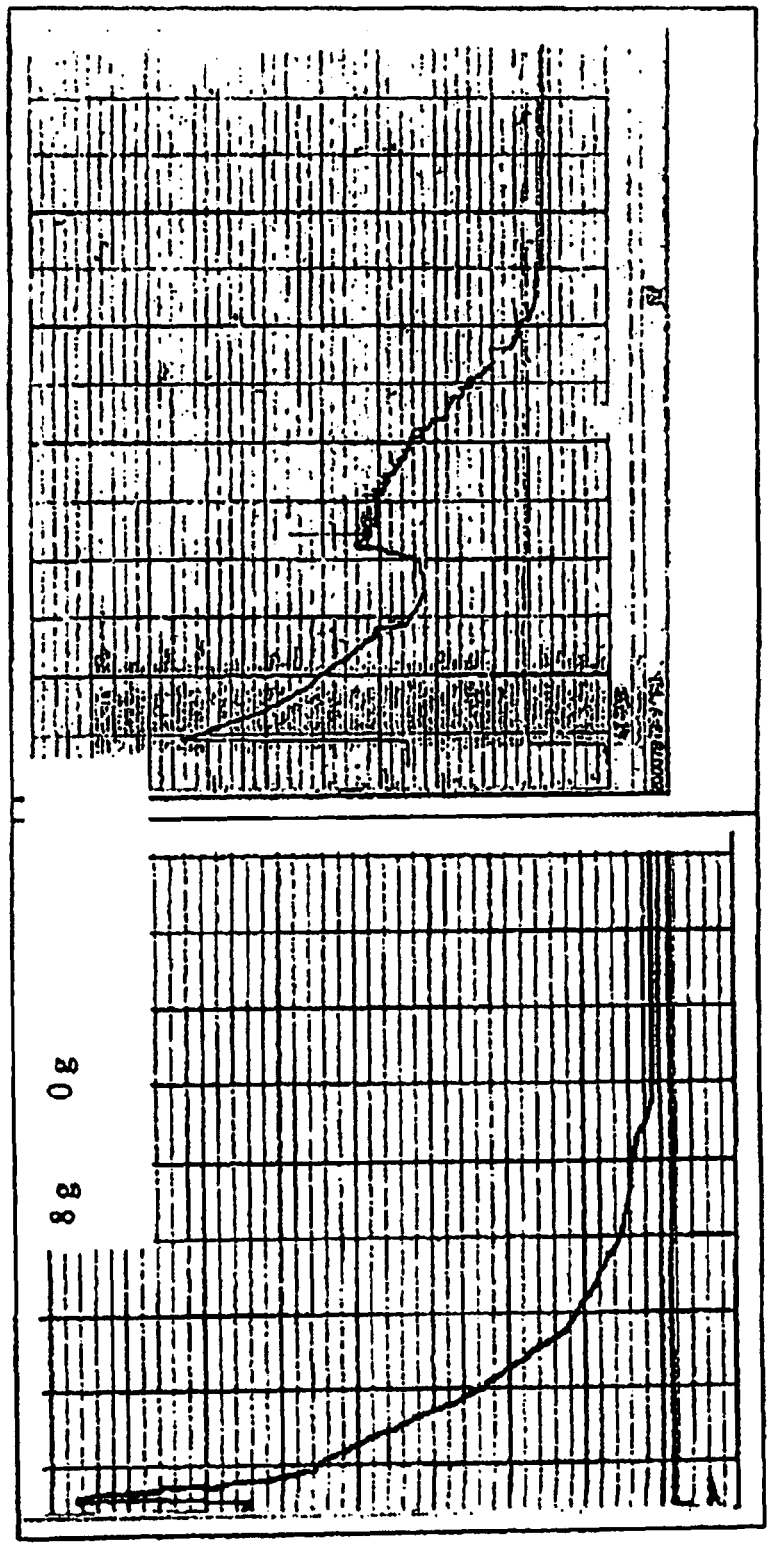
FIG. 1A is an example according to the present invention.
FIG. 1B is a comparative example.

It has been found as a whole to be surprising that the novel graft polymers in any desired mixtures thereof according to the present invention not only can be used as flow improvers very generally in construction chemistry applications but that they display an outstanding effect in particular as fluid loss additives, especially in the high-performance area. In fact, in addition to the desired property of water solubility and biodegradability, they generally have a particularly pronounced salt stability and just as pronounced a temperature stability. Moreover, it was surprisingly found that these graft polymers in any desired mixtures thereof have a so-called "gel breaker effect". As a result of this effect, premature and undesired stiffening of the cement slurries is prevented. It was not to be foreseen that overall water-soluble and biodegradable graft polymers which additionally show a significant dispersing effect were obtainable with the aid of a grafting base nonbiodegradable per se, such as brown coal and polyphenol compounds.

In a preferred variant of the present invention, the graft polymers of the claimed mixture contain the monomer components a) and b) as a grafting base and/or graft component and the monomer component c) as the graft component. Furthermore, it is regarded as being advantageous that the graft polymers consist of different variants: according to alternative I), the monomer component a) acts as a grafting base and at least one of the monomer components b) and c) as a graft component; alternative II) envisages that the monomer component b) is present as a grafting base and at least one of the monomer components a) and c) act as graft components; according to variant III), the graft polymers consist of the monomer component a) as grafting base, onto which in turn a graft product consisting of the component b) as a base and the monomer component c) as a graft component is grafted; a similar doubly grafted graft polymer comprises the alternative IV), a graft product which has the component a) as a base and the monomer component c) as a graft component is grafted onto the monomer component b), which acts as a grafting base.

The present invention takes into account, as preferred monomer component a), at least one member of the series consisting of brown coal, brown coal coke, lignite and brown coal derivatives, such as, for example, lignosulphonates and humic acid, and tannins.

Regarding the monomer component b), natural polyamides are here particularly preferably caseins, gelatins, collagens, bone glues, blood albumins, soya proteins and the degradation products thereof formed by oxidation, hydrolysis or depolymerisation, and synthetic polyamides and once again the degradation products thereof formed by oxidation, hydrolysis or depolymerisation, are suitable. Of course, all possible mixtures thereof are also suitable.

The monomer component c) preferably comprises vinyl-containing compounds in their O, S, P and N forms, selected from the series of the vinyl ethers, acrylic acid, methacrylic acid, 2-ethylacrylic acid, 2-propylacrylic acid, N,N-dimethylmethylacrylamide, vinylacetic acid, vinylphosphonic acid, crotonic and isocrotonic acid, maleic acid, fumaric acid, itaconic acid, citraconic acid and the esters and amides thereof, and styrenes. The sulphonated forms thereof are to be regarded as being particularly preferred, such as vinyl-containing sulphonic acid of the series 2-acrylamido-2-methyl-propanesulphonic acid (AMPS), vinylsulphonic acid, methallylsulphonic acid and the at least monovalent salts thereof and any desired mixtures thereof.

In a further preferred variant, the grafted copolymer may contain the polyamide component b) in proportions of 10 to 95% by weight and preferably of 50 to 80% by weight. The ethylenically unsaturated monomer component c) should be present in proportions of 10 to 95% by weight and preferably of 50 to 80% by weight. Regarding the grafting base, the present invention envisages that, independently of the chemical structure thereof, these are present in preferred proportions of 0.1 to 60% by weight and preferably of 0.5 to 50% by weight in the graft polymers.

Overall, the present invention also takes into account so-called "double" graft copolymers, in this specific case, for example, an acrylate polymer grafted onto a brown coal or tannin derivative, i.e. in the wider sense onto a polyphenol base, being grafted onto gelatin. Thus, an originally nonbiodegradable polymer becomes biodegradable and also water-soluble. However, the grafting of a polyphenol compound, which in turn may additionally be grafted, onto a polyamide, such as, for example, gelatin, with the result that a biodegradable and water-soluble graft polymer likewise forms, is also possible.

This is also the reason why graft polymers which are water-soluble and/or biodegradable and hence impart the same properties to the resulting mixtures are to be regarded as being preferred.

In addition to the graft polymer mixture, the present invention also comprises a process for the preparation of the graft polymers present therein. Preferably, in a first step A), the monomer component c) is grafted onto the monomer component b), i.e. typically a casein, a gelatin or a collagen, at temperatures between −10° C. and 250° C., and in particular between 0° C. and 100° C. This is preferably effected in each case in the presence of a solvent and in particular of a polar solvent, such as water or dimethyl sulphoxide. In a second step, the graft product thus obtained is grafted onto the monomer component a) as a grafting base, resulting in the "doubly grafted" product. Alternatively or in parallel, B), the monomer component c) can be grafted onto the monomer component a) under the abovementioned process conditions. Finally, it is envisaged according to the invention optionally to mix the graft polymers obtained from the steps A) and B). All other conceivable graft polymers according to the invention can also be prepared under the stated conditions.

It is also possible in step A) for the monomer component b) to be functionalized with a double bond and then polymerized with the monomer component c) in the presence of the monomer component a).

Regarding said functionalization, the present invention envisages that this is effected, with regard to the monomer component b), by reaction with not more than 10% by weight of an anhydride compound of the maleic anhydride or methacrylic anhydride type or an epoxide compound of the glycidyl methacrylate type.

The present invention envisages, as an additional alternative to the process just described and comprising its partial steps A), B) and optionally C), reacting the monomer components a), b) and c) at temperatures between −10° C. and 250° C. and in particular between 0° C. and 100° C., which in turn should preferably be effected in each case in the presence of a solvent and in particular of a polar solvent, such as water or dimethyl sulphoxide.

With this process variant but also with the abovementioned process variant, graft polymer mixtures are obtained which contain I) a doubly grafted polymer consisting of the monomer component a) as a grafting base and a grafted-on graft product consisting of the monomer component b) as a base and the monomer component c) as a graft component, II) a doubly grafted polymer consisting of the monomer component b) as a grafting base and a graft product grafted thereon, this consisting of the monomer component a) as a base and the monomer component c) as a graft component, III) a graft product consisting of the monomer component a) as a base and the monomer component b) as a graft component, IV) a graft product consisting of monomer component a) as a base and the monomer component c) as a graft component, V) a graft product consisting of the monomer component b) as a base and the monomer component a) as a graft component, and any desired mixtures thereof.

Owing to the fact that the monomer components a) and b) can in each case act both as a grafting base and as graft components, it is evident that, under said process conditions, graft polymers are obtainable which have different monomer combinations and may also be present in the doubly grafted state. Only the monomer component c), i.e. the ethylenically unsaturated monomers different from one another, act exclusively as graft components and are not available as grafting base.

In addition, additional crosslinking and/or postcrosslinking of the graft copolymers obtained is envisaged, which can be effected in particular with the aid of polyfunctional ethylenically unsaturated compounds, such as, for example, di- or trimethacrylates.

In this or a similar manner, graft polymers which have preferred molar masses $\overline{M}$>5000 g/mol and in particular >10 000 g/mol are obtained, graft polymers having $\overline{M}_n$>50 000 g/mol being regarded as being particularly preferred in the mixtures according to the present invention.

In spite of the broad potential applications which are actually not limited, the present invention envisages construction chemistry applications as a whole and the development, exploitation and completion of underground mineral oil and natural gas deposits in particular and moreover deep wells as a preferred use of said graft polymer mixtures. The graft polymer mixtures described are particularly suitable as an additive for compositions containing hydraulic binders and in particular as fluid loss additives and/or flow improvers. However, they can also be used in the cementing of oil and gas wells, preferably in the offshore area, which is likewise encompassed by the present invention.

In summary, it may be stated that the object, namely the provision of novel water-soluble and/or biodegradable graft copolymers, was not only fulfilled by the proposed mixtures but could be surpassed because the mixtures of the described polymer compounds have a high temperature and salt stability, it also having been possible to make originally nonbiodegradable compounds based on brown coal and/or polyphenols biodegradable and hence to make them accessible to new areas of use. The starting materials are available without major limitations and the novel graft polymers can in general be prepared in an economical manner without a major technical effort.

The following examples illustrate the advantages of the graft polymers according to the invention.

EXAMPLES

The following preparation examples 1 and 2 illustrate the functionalization of the monomer component b):

1. Preparation Examples

Example 1.1

540 g of technical grade gelatin (bloom 0) were dissolved in 1260 g of water with heating to 70° C. The pH was adjusted to 8.5 with a 20% strength NaOH solution. 25.5 g of maleic anhydride were then added in portions in the course of 60 min. During this procedure, the pH were kept at 8.5 by simultaneously metering in NaOH (20%). After the complete addition of the maleic anhydride, stirring was effected for a future 60 min at 70° C.

Example 1.2

175 g of technical grade gelatin (bloom 330) was dissolved in 1260 g of water with heating to 70° C. The pH was adjusted to 8.5 with a 20% strength NaOH solution. 34 g of maleic anhydride were then added in portions in the course of 60 min. During this procedure, the pH was kept at 8.5 by simultaneously metering in NaOH (20%). After the complete addition of the maleic anhydride, stirring was effected for a further 60 min at 70° C. A high molecular weight polyamide having a high degree of fictionalization was obtained.

Example 1.3

Humic Acid-Based Graft Polymer 57 g of 50% strength sodium hydroxide solution were introduced into 245 g of water, and 59 g of acrylamidopropanesulphonic acid (monomer component c)) were dissolved therein in portions. The temperature must not exceed 35° C. Thereafter, the pH was adjusted to 11.5 to 12.5 and 175 g of 15% strength humic acid were added. 250 g of the functionalized polyamide from Preparation Example 1 (monomer component b)) are added and the pH adjusted to 9.5. During the heating to the starting temperature of 61° C., nitrogen was passed through the reaction mixture. Before the polymerization was started by 13.5 g of 33% strength sodium peroxodisuiphate solution and 1.5 g of tetraethylpentamine, the addition of 26 g of dimethylaminomethacrylate (crosslinking agent) was effected. The reaction mixture was stirred for 2 hours at 80 to 85° C. and the pH was then adjusted to 8.

Example 4

Lignite-Based Graft Polymer 800 g of water, 100 g of 50% strength sodium hydroxide solution and 65 g of lignite were mixed using an Ultra-Turrax and then initially introduced into a 2 l glass flask. 200 g of acrylamidopropanesulphonic acid (monomer component c)) were then dissolved therein in portions. The temperature must not exceed 35° C. 6 g of acrylic acid and 60 g of dimethyl methacrylate were used as further comonomers c). During the heating to the starting temperature of 70° C., nitrogen was passed through the reaction mixture. 500 g of the functionalized polyamide (monomer component b)) from Preparation Example 2 were likewise preheated to 70° C. and then added to the reaction mixture. The pH was between 10 and 11. The polymerization was started 3 times with altogether 45 g of 30% strength sodium peroxodisulphate solution. The reaction mixture was stirred for 2 hours at 70° C. and the pH was then adjusted to 11.

Example 5

Tannin-Based Graft Polymer 1200 g of water and 84 g of soda pellets were initially introduced into a 2 l glass flask. 416 g of acrylamidopropanesulphonic acid (monomer component c)) were then dissolved therein in portions. The temperature must not exceed 35° C. 0.5 g of methylenebisacrylamide and 18 g of methacrylamide were used as further comonomers c). During the heating to the starting temperature of 65° C., nitrogen was passed through the reaction mixture. 550 g of the functionalized polyamide (monomer component b)) from Preparation Example 2 were likewise preheated to 65° C. and then added to the reaction mixture. The pH was between 9 and 10. A 33% strength ammonium persulphate solution was metered in continuously over a period of 35 minutes as initiator. Thereafter, a 33% strength sodium bisulphite solution was added. The reaction mixture was then stirred for a further 2 hours at 70° C. and the pH was then adjusted to 11.

2. Use Examples

2.1) As Fluid Loss Additives

The biodegradable graft polymers obtained from Preparation Examples 3 to 5 are suitable as fluid loss additives for a multiplicity of conditions, such as different concentrations of monovalent or polyvalent salts and different temperature ranges. Depending on the monomer composition, high or low cement slurry rheologies can be obtained or established.

Such examples are listed in Tables 1 and 2:

TABLE 1

| | Composition of the cement slurries: | | | | | | |
|---|---|---|---|---|---|---|---|
| Test slurry | Polymer from example | Dose [% bwoc] | T [° C.] | w/c | Cement | Salt content | Aggregates [% bwoc] |
| 1 | 1.3 | 0.2 | 82 | 0.38 | Class G | Fresh water | — |
| 2 | 1.3 | 0.2 | 82 | 0.44 | Class G | Fresh water | — |
| 3 | 1.3 | 0.2 | 82 | 0.38 | Class H | Seawater | — |
| 4 | 4 | 0.2 | 52 | 0.44 | Class G | Seawater | — |

TABLE 1-continued

Composition of the cement slurries:

| Test slurry | Polymer from example | Dose [% bwoc] | T [° C.] | w/c | Cement | Salt content | Aggregates [% bwoc] |
|---|---|---|---|---|---|---|---|
| 5 | 4 | 0.5 | 102 | 0.44 | Class H | NaCl saturated | 15% bwoc $Fe_2O_3$ 44% bwoc Sand |
| 6 | 5 | 0.06 | RT | 0.38 | Class H | Fresh water | — |

TABLE 2

Fann 35 rheology and fluid loss values:

| Test slurry | Fann 35 rheology [300-200-100-6-3-600] | T [° C.] | FL [ml] | Dose [% bwoc] |
|---|---|---|---|---|
| 1 | 193-135-72-4-2 > 300 | 82 | 24 | 0.2 |
| 2 | 103-71-38-2-1-187 | 82 | 22 | 0.2 |
| 3 | 220-160-92-11-7 > 300 | 82 | 26 | 0.2 |
| 4 | 200-149-90-15-14 > 300 | 52 | 42 | 0.1 |
| 5 | 230-162-87-6-3 > 300 | 102 | 26 | 0.5 |
| 6 | 81-54-28-2-1-155 | RT | 26 | 0.06 |

2.2) As Gel Breakers

In the case of some cements or cement slurry formulations, so-called premature stiffening is observable, in which the cement slurry initially thickens and then becomes fluid again before the final setting.

This can be documented using the HTHP consistometer.
Composition of the Cement Slurry:
800 g of Dyckerhoff Class G cement
8 g of fluid loss polymer
X g of polymer according to Preparation Example 1.3 (as gel breaker)
369 g of North Sea water

The invention claimed is:

1. A graft polymer mixture based on grafting bases different from one another comprising component a) at least one of brown coal or polyphenol derivatives, and component b) polyamides and component c) ethylenically unsaturated monomers differing from one another, said graft polymer mixture having a pH value of from 8 to 11, wherein the grafted copolymer contains the component b) in an amount of 10 to 95% by weight, and the component c) is present in amount of from 10 to 95% by weight.

2. A graft polymer mixture according to claim 1, wherein components a) and b) are a grafting base or graft component and the component c) is a graft component.

3. A graft polymer mixture according to claim 1, wherein the graft polymer contain I) the component a) as a grafting base and at least one of the components b) and c) as a graft component, II) the component b) as a grafting base and at least one of the components a) and c) as a grafting component, III) the monomer component a) as a grafting base onto which a graft product consisting of the component b) as a base and component c) as a graft component is grafted, and IV) the component b) as a grafting base, onto which a graft product consisting of the component a) as a base and the component c) as a graft component is grafted.

4. A graft polymer mixture according to claim 1, wherein the component a) is at least one member selected from the group consisting of consisting of brown coal, brown coal coke, lignite and a brown coal derivative.

5. A graft polymer mixture according to claim 1, wherein the component a) is at least one member selected from the group consisting of consisting of a lignosulphonates, humic acid, and a tannin.

6. A graft polymer mixture according to claim 1, wherein the component b) is at least one member selected from the group consisting of a natural polyamide, a synthetic polyamide, a degradation product of the natural polyamide formed by oxidation, hydrolysis, depolymerization, and a degradation product of the synthetic polyamide formed by oxidation, hydrolysis, depolymerization.

7. A graft polymer mixture according to claim 1, wherein the component b) is at least one member selected from the group consisting of a casein, a gelatin, a collagen, a bone glue, a blood albumin and a soya protein.

8. A graft polymer mixture according to claim 1, wherein component c) is at least one vinyl-containing compound selected from the group consisting of a vinyl ether, acrylic acid, methacrylic acid, 2-ethylacrylic acid, 2-propylacrylic acid, N,N-dimethylmethacrylamide, vinylacetic acid, vinylphosphonic acid, crotonic and isocrotonic acid, maleic acid, fumaric acid, itaconic acid, citraconic acid, and a styrene.

9. A graft polymer mixture according to claim 8, wherein the component c) is in sulfonated form.

10. A graft polymer mixture according to client 8, wherein the component c) is a monovalent salt.

11. A graft polymer mixture according to claim 1, wherein the graft polymer the total amount of grafting base is from 0.1 to 60% by weight.

12. A graft polymer mixture according to claim 1, wherein the graft polymers in the graft polymer mixture are water-soluble or biodegradable.

13. A process for the preparation of the graft polymer mixture according to claim 1, wherein
    A) in a first step, the component c) is grafted onto the component b) at a temperature between −10° C. and 250° C., and
    B) in a second step, the graft product thus obtained is grafted onto the component a) or the component c) is grafted onto the component a).

14. The method of claim 13, wherein at least the first step A) is conducted in the presence of a polar solvent.

15. The process of claim 13, wherein the temperature ranges from 0 to 100° C.

16. The process of claim 14, wherein the polar solvent is at least one of water or dimethylsulfoxide.

17. The process of claim 13, wherein second step B) is conducted at a temperature of from −0° C. to 250° C.

18. The process of claim 13, wherein, in step A), the component b) is functionalized with a double bond and then polymerized with the component c) in the presence of the component a) as a grafting base.

19. A process according to claim 18, wherein the functionalization of the component b) is effected by reaction with not more than 10% by weight of an anhydride compound of the maleic anhydride, a methacrylic anhydride or an epoxide of glycidyl methacrylate.

20. A process for preparing the graft polymer of claim 1, wherein the components a), b) and c) are reacted at temperatures between −10'C and 250° C. in the presence of a solvent.

21. A process according to claim 13, wherein a graft polymer mixture is obtained which contains I) a doubly grafted polymer consisting of the component a) as a grafting base and a grafted-on graft product consisting of them component b) as a base and the component c) as a graft component, II) a doubly grafted polymer consisting of the component b) as a grafting base and a grafted-on graft product consisting of the component a) as a base and the component c) as a graft component, III) a graft product consisting of the component a) as a base and the component c) as a graft component, III) a graft product consisting of the component a) as a base and the component b) as a graft component, IV) a graft product consisting of the component a) as a base and the component c) as a graft component, V) a graft product consisting of the component a) as a base and the component b) as a graft component, and mixtures thereof.

22. A process according to claim 13, wherein the copolymers obtained are additionally crosslinked, postcrosslinked or crosslinked and postcrosslinked with a polyfunctional ethylenically unsaturated compound.

23. A process according to claim 13, wherein the graft polymers has a molar mass $\overline{M}_n$>5000 g/mol are obtained.

24. A method comprising developing, exploiting or completing an underground mineral oil or natural gas deposit with graft polymer mixture according to claim 1.

25. The method of claim 24, wherein the developing, exploiting or completing is in a deep well.

26. A construction chemical comprising the graft polymer mixture of claim 1.

27. An additive for a composition containing hydraulic binder comprising a graft polymer mixture of claim 1 in an amount sufficient to be at least one of a fluid loss additive or a flow improver.

28. A method for enhancing flow properties of a composition containing hydraulic binder comprising adding a graft polymer mixture of claim 1 to the composition in an amount sufficient to prevent or improve fluid loss of the composition or to improve the flow of the composition.

29. A method cementing oil and gas wells by cementing said well with a cement comprising the graft polymer mixture of claim 1.

30. The method of claim 29, wherein the well is an offshore well.

31. An additive for a composition containing hydraulic binder comprising a graft polymer mixture of claim 1 in an amount sufficient to be a gel breaker.

32. An additive according to claim 27, wherein the graft polymer mixture is present in an amount to also provide a gel-breaking effect.

* * * * *